March 29, 1938.   H. A. H. J. SCHAFFNER   2,112,411
OPTICAL SYSTEM FOR MOTOR HEADLIGHTS AND PROJECTORS
Filed July 7, 1936   3 Sheets-Sheet 1
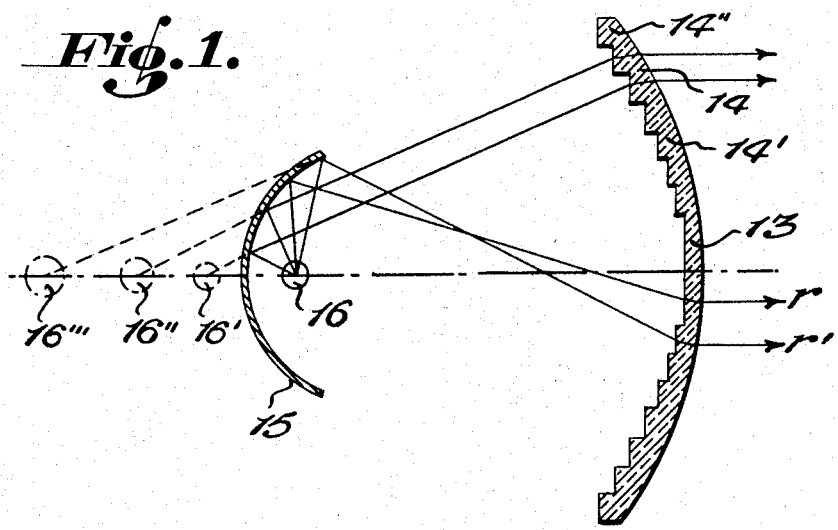
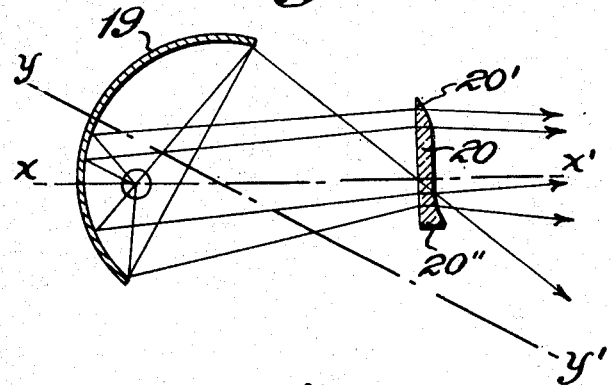
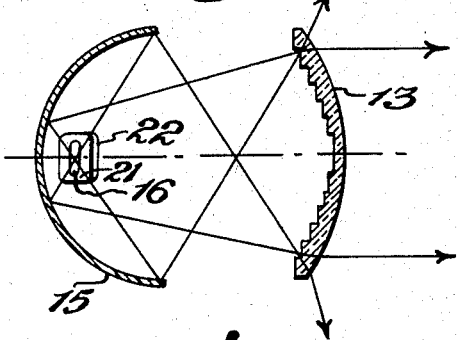
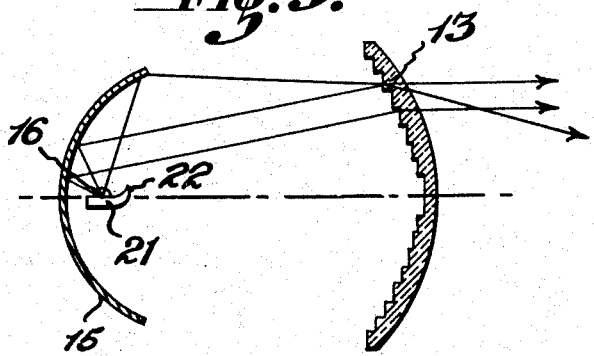
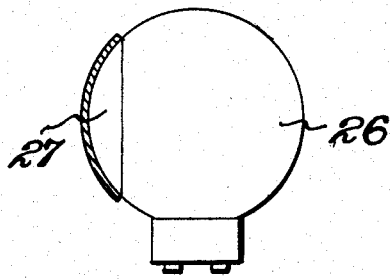
INVENTOR.
H. A. H. J. Shaffner
BY Glascock Downing Hulbo
ATTORNEYS.

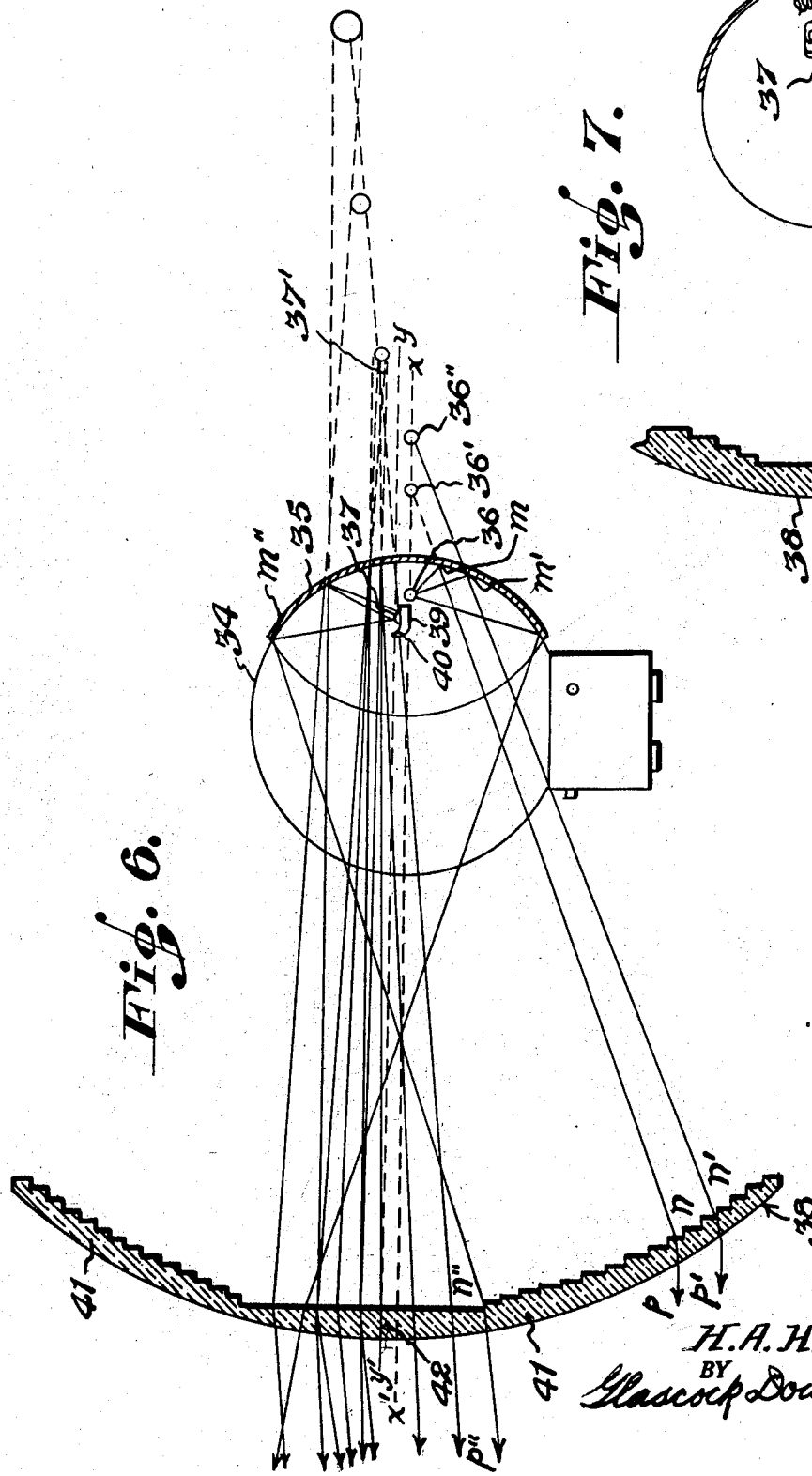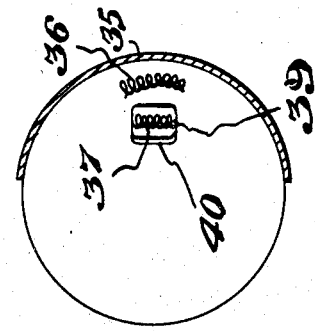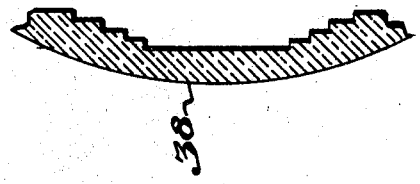

March 29, 1938. H. A. H. J. SCHAFFNER 2,112,411
OPTICAL SYSTEM FOR MOTOR HEADLIGHTS AND PROJECTORS
Filed July 7, 1936 3 Sheets-Sheet 3
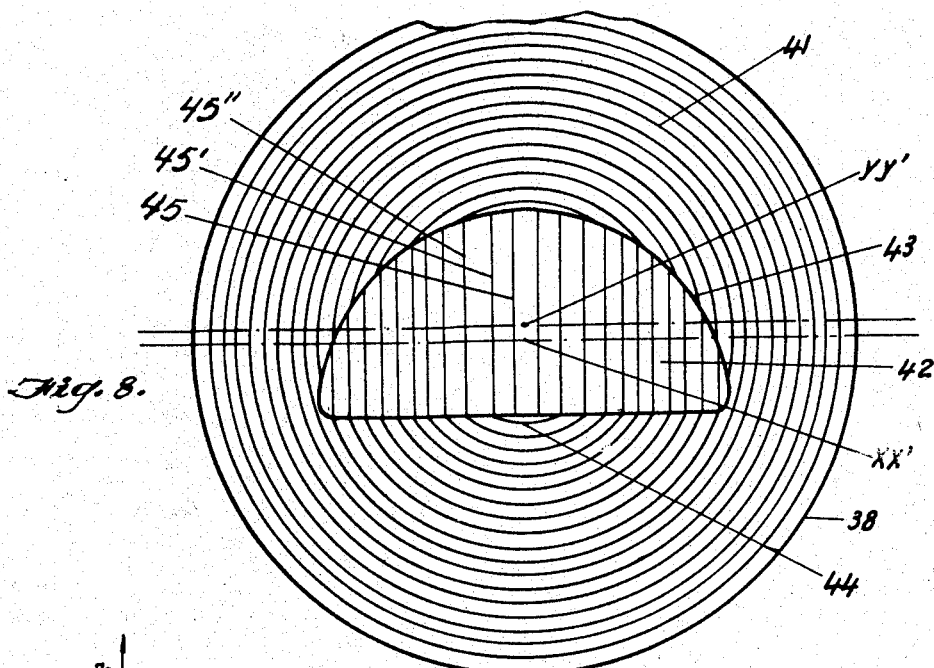
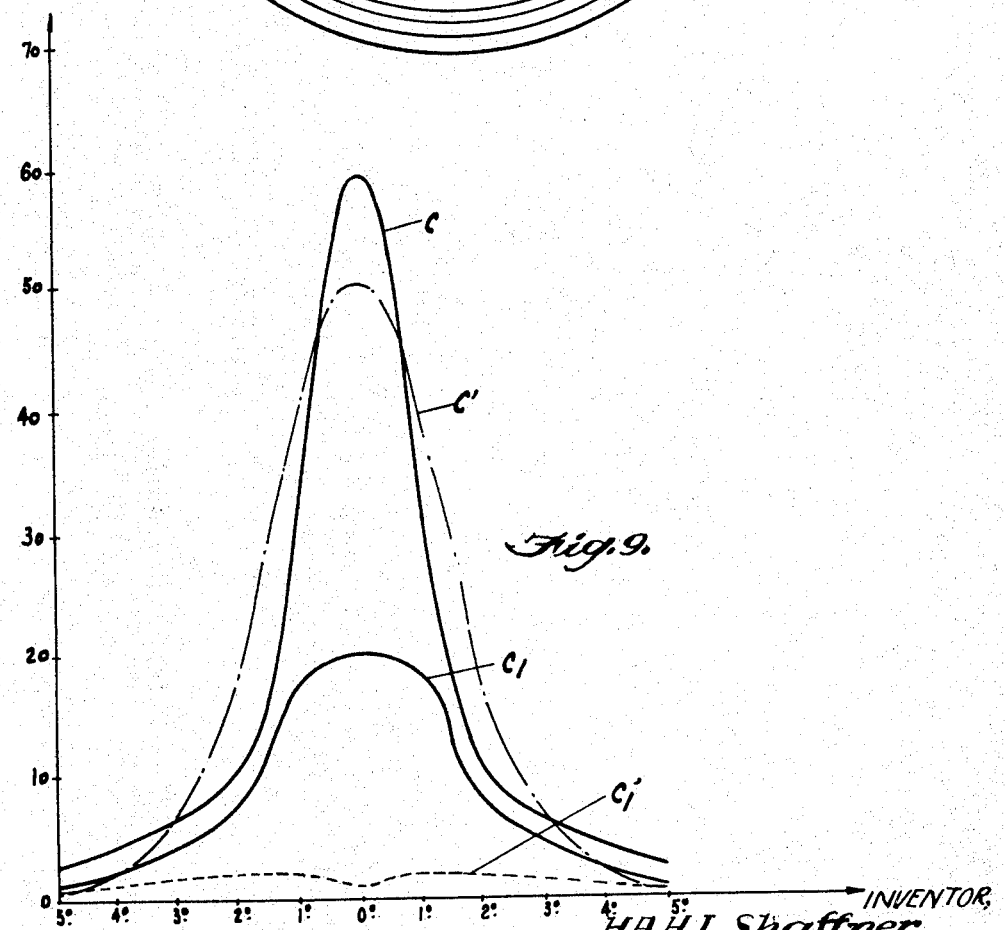

Patented Mar. 29, 1938

2,112,411

UNITED STATES PATENT OFFICE 2,112,411

OPTICAL SYSTEM FOR MOTOR-HEADLIGHTS AND PROJECTORS

Henri Alexandre Hippolyte Joseph Schaffner, Paris, France

Application July 7, 1936, Serial No. 89,438
In France July 19, 1935

6 Claims. (Cl. 240—41.3)

The present invention relates to an optical system for headlamps and light projectors whereby a light beam can be obtained of which the shape is determined by the shape of the source of light used and which is sharply defined at the edges, for example by a circular contour in the case of a searchlight projector or by a horizontal straight line in the case of courtesy lighting for automobiles.

It is well known that as a source of light has definite dimensions, each point of a reflector illuminated by such a source no longer emits a ray of light, as would be the case for a theoretical point source, but an elementary conical pencil of which the opening, which is equal to the angle from which the source is seen from each point of the reflector, is all the greater as the point in question of the reflector is nearer the source: it ensues that the pencil includes a narrow central portion of great intensity formed by the elementary conical pencils of small opening emanating from the marginal zones of the reflector which are distant from the source, and by a much larger outer portion the intensity of which progressively decreases towards the edges and which is formed by the elementary pencils of wide opening emanating from the central zone of the reflector which is near the source, so that, in the case of the searchlight projector and using a spherical source, a sharply defined homogeneous beam cannot be obtained.

When it is required to obtain a beam of elongated rectangular shape using for example a transverse cylindrical source placed at the focus of the reflector, the result is still more unfavourable; in fact, only the small central zone of the reflector wherein the planes which are tangential to the reflector are substantially perpendicular to the optical axis, produce elementary pencils of which the cross-sections through the plane to be illuminated are formed by rectangles the large axis of which is substantially parallel with the axis of the cylindrical source, which can be expressed by saying that said small central zone of the reflector is substantially anastigmatic; on the other hand, as the planes which are tangential at various points of the marginal zones of the reflector are oblique to its optical axis, the elementary pencils issuing from said points cut the plane to be illuminated along rectangles the large axes of which are inclined at different angles with respect to the axis of the cylindrical source. Now, as it is precisely these elementary pencils of small opening emanating from the astigmatic marginal source of the reflector which have the greatest range, the beam is made up of a central portion of great intensity having an eight-shaped cross-section and which is surrounded by a vast zone of decreasing intensity produced by the anastigmatic central zone of the reflector, so that it is impossible to limit said beam to one plane by using, for example, a straight edged screen. One might think of overcoming this drawback by reducing the reflector to its approximately anastigmatic central zone and by furthermore choosing a reflector having a small diameter relatively to its focal distance. However, under these circumstances the fraction of flux emitted by the source which is received by the reflector is very small so that the apparatus is very inefficient.

The optical system which is the object of the present invention is intended to overcome all these drawbacks by adding to the concave reflector a second optical element, constituted by a refractor forming the outlet face of the apparatus, and it is characterized by the fact that the source is arranged outside the focus of the anastigmatic central zone of the concave reflector, that the refractor is arranged at such a distance from the said concave reflector, that it is entirely illuminated by the beam reflected by the latter and that, seen in projection on a plane perpendicular to the optical axis of the system, the surface of the refractor illuminated by the anastigmatic central zone of the reflector is a greater fraction of the total surface of said refractor, than the fraction of the total surface of the reflector occupied by the surface of the anastigmatic central zone, and finally that in this position of the refractor the focus of the latter coincides with a point of the image of the source from the anastigmatic central zone of the reflector.

It ensues from this arrangement that on the illuminated apparent surface of the apparatus and which is formed by the refractor, the flux issuing from the anastigmatic central zone of the reflector is spread over a considerable surface at the expense of the flux issuing from the astigmatic marginal zone of the reflector, that is to say that the small anastigmatic central zone which is violently illuminated, but of small area (therefore useless for distant lighting) of the reflector, is replaced by a zone of the second element, which zone is less brightly illuminated but has a sufficient surface for distant lighting, this substitution enabling the properties to be retained for the central portion of the beam emerging from the apparatus, which are due to the anastigmatism of the reflector from which said portion issues. On the other hand, the spreading thus produced, on the outlet surface of the apparatus, of the flux issuing from its marginal zone leads to the fact that, contrary to what occurs in all the known apparatus, the illumination at the surface of the outlet element is constant or even increases from the centre towards the edges according to the extent to which the source is out of focus. Now, calculation readily shows that the opening of an elementary conical pencil issuing from an illuminated surface is proportional to the illumination at this point so that by means of the optical system according to the invention the emergent beam will be composed of elementary conical pencils which will all have the same opening in the case of constant illumination, which, in the case of the searchlight projector, enables a sharply defined beam of homogeneous circular cross-section to be obtained with a spherical source; or again, in the case of illumination increasing from the centre towards the edges of the outlet face, the elementary cones issuing from the central zone of said outlet face and produced by the anastigmatic central region of the reflector will have the smallest opening and can be used for distant lighting by enabling, owing to the anastigmatism of the zone of the reflector from which they issue, the shape of the long range beam to be determined by the shape of the source, whereas the elementary cones issuing from the marginal zone of the outlet face will have a larger opening and can be used for illuminating the regions near the apparatus.

By way of example, several embodiments of the optical system according to the invention have been described hereinafter and illustrated in the accompanying drawings.

Fig. 1 shows diagrammatically, an optical system according to the invention.

Fig. 2 shows, in sectional elevation, an embodiment of the invention enabling a cut off beam to be produced which is limited to a horizontal plane, and which is applicable in particular to "courtesy" lighting for automobiles.

Figs. 3 and 4 show respectively, in sectional elevation and in plan view, another embodiment of the invention supplying a beam having a horizontal rectilinear cut off.

Fig. 5 shows an incandescent electric lamp with a silvered wall used as a reflector in the optical system according to the invention.

Figs. 6, 7 and 8 show respectively in axial sectional elevation, in horizontal axial section and in front elevation, a detailed embodiment of a complete automobile headlamp according to the invention.

Fig. 9 shows the curves of lighting intensity of the projector according to Figs. 6 to 8, and the corresponding curves for a projector of the usual type.

The general means which enables the spreading on a large surface of the refractor of the flux emitted by the anastigmatic central zone of the reflector is the placing of the source of light out of focus with respect to the first reflector (in the explanations which follow the foci of a reflector will be understood to mean the points to which converge the rays of a beam which is parallel with the optical axis and which impinges on said reflector).

Assuming, for example, a reflector having a single focus, that is to say a parabolical reflector: when the source of light is arranged at the focus, the reflected beam is parallel (at least the axes of the elementary cones emitted by all the points of the reflector are parallel). If the source is now moved away from the focus towards the vertex of the reflector, it is known that the beam becomes divergent and, as for a given displacement of the source along the optical axis, the angle of incidence of the rays which it emits on the various points of the reflector increases as said points are nearer the vertex of the reflector, the rays reflected by the central zone become more divergent than those reflected by the marginal zones, the divergence progressively decreasing from the centre towards the edges of the reflector. By placing at a suitable distance from the reflector, a convergent lens of which the successive concentric zones have foci which coincide with the virtual images of the source which are supplied by the successive zones of the parabolical reflector, a parallel beam is obtained of which the central part, which in this case has a cross-section of considerable area, comes initially from the small central anastigmatic zone of the reflector.

The reverse phenomenon occurs if the source is moved away from the vertex of the parabolical reflector starting from the focus: in this case the central part of the beam becomes more convergent than the marginal part and, to obtain the same final result, the convergent lens wil be placed after the nodal points or real images of the source which are supplied by the reflector.

Instead of using a parabolical reflector having a single focus with respect to which the source is placed out of focus, an aberrated reflector having a large number of foci can also and even more easily be used, provided that such reflector still has a small substantially anastigmatic central zone. Furthermore, it will readily be realized that to obtain the desired effect, that is to say a decrease in the divergence or in the convergence of the reflected beam from the centre towards the edges of the reflector, it is also necessary:

1. That all the foci of the marginal zones of the reflector should be on the same side with respect to the focus of the central anastigmatic zone, said foci being the more remote from the focus of the central zone as the corresponding zones of the reflector are themselves more remote from said central zone.

2. That the source should be arranged on the same side of the focus of the central zone as the other foci of the reflector. At the limit, the source can be arranged at the actual focus of the central zone: in this case the source is in focus for the small central zone of the reflector and out of focus with respect to the rest of the reflector, which amounts to decreasing the part played by the marginal zone of the reflector, for the benefit of the central anastigmatic zone.

Under these circumstances, according to whether the marginal foci are between the focus of the central zone and the vertex of the reflector (this is the case of the spherical or elliptical reflector) or beyond the focus of the central zone (hyperbolical reflector), a reflected beam will be obtained the central portion of which will be more divergent or more convergent than the marginal portion, and by placing a refractor as above indicated for the parabolical reflector, the desired effect will be obtained.

Fig. 1 shows a particularly simple embodiment wherein a spherical shaped reflector 15 is used which is supplied by a source 16 arranged at a distance from the vertex of the reflector of approximately between one third and one fifth of the radius of the sphere so as to produce a reflected beam the divergence of which progressively decreases from the centre towards the edges. Said spherical reflector 15 supplies with light rays in its turn a stepped lens 13 the steps of which constitute concentric zones each having their own focus.

In the case of a searchlight projector or of a long range lighting projector without horizontal cut off, the steps 14, 14', 14'' . . . etc. of the lens 13 are calculated in such a manner that their foci coincide respectively with the virtual images 16', 16'', 16''' . . . etc. of the source 16 in the reflector 15, that is to say so as to make all the emergent rays parallel. However, in the case of a lighting projector, it is frequently advantageous to make parallel by means of the steps of the lens 13 only the greater part of the light rays issuing from the reflector and which thus serve for distant lighting, and to use for lighting the regions near the apparatus the rays issuing from the very astigmatic marginal zone of a surrounding reflector, as is the case of the convergent rays such as r, r' issuing from the extreme marginal zone of the spherical reflector 15 of Fig. 1. These rays, which are intended for near lighting, pass through the lens 13 in the regions which already serve for distant lighting by means of the rays issuing from the anastigmatic central zone of the reflector 15. It will therefore be seen that the invention permits at the same time of a great axial power and a satisfactory illumination in a field of extensive width near the projector, owing to the possibility of using a very enveloping reflector which receives a considerable part of the luminous flux emitted by the source.

In the case of a lighting projector intended to supply a beam with a horizontal cut off, the source will be transverse (cylindrical or rectilinear), and the lens is calculated so as to make parallel only the rays issuing from the substantially anastigmatic central zone of the reflector so as to supply a distant lighting beam which can be cut off along a horizontal straight line, whereas the rays issuing from the astigmatic marginal zones of the reflector will be turned downwards by suitably choosing the focal distances of the steps on which they impinge of said lens.

Instead of calculating the steps of the marginal zone of the lens in the above indicated manner, other devices, some of which have been indicated hereinafter, can be used either for turning down or for cutting the part of the beam located above the horizontal cut off plane; thus in the case of Fig. 2 this result is obtained by arranging the spherical segment shaped reflector 19 so that its marginal plane and its axis of symmetry Y'Y is inclined with respect to the optical axis X'X of the system, whereas the lens 20 comprises a convergent portion 20' arranged above the horizontal plane passing through the optical axis, and a divergent portion 20'' arranged below said plane.

Finally, the beam can be turned downwards by arranging the reflector and the source so that they can be tilted together, the second element remaining fixed.

According to Figs. 3 and 4 which show another device in vertical and in horizontal section respectively, the source is arranged in a cup 21, optionally provided in front with a screen 22 which eliminates the glare of the source. The edge of the reflector is shaped in such a manner that it is more enveloping in the horizontal plane (Fig. 4) than in the vertical plane (Fig. 3) so as to provide a beam which is very open horizontally.

As the beam emanating from the small anastigmatic zone at the centre of the reflector is spread out, in all the embodiments of the invention, on to a second element of large area, projectors can be produced having a large apparent surface with a reflector of small dimensions. Under these circumstances, the reflector can be advantageously formed by silvering part of the wall of a spherical electric lamp 26 (Fig. 5), the silvered spherical segment 27 being disposed either symmetrically or at an angle as in Fig. 2, relatively to the optical axis of the optical system.

The optical system according to the invention can be applied in particular to the construction of combination or dual-beam headlamps for automobiles, adapted to provide either an intense beam of long range and wide field, called "road light", or a turned down beam limited to a horizontal plane and called "courtesy light" or "driving light". In this case, a reflector like one or the other of those described above will be used, and two distinct sources of light adapted to be operated separately will be arranged in such a manner as to produce in the reflector two different beams, impinging on the second optical element of the system in two zones which may be entirely distinct or may overlap one another, and of which the characteristics are calculated so that the luminous flux which they receive shall be appropriately distributed in the field. Figs. 5 and 7 show respectively in axial elevational section and in axial horizontal section a combination system of this kind wherein the reflector consists of a silvered portion of a spherical lamp 34 having a vertical axis, the silvered portion 35 being shaped like the reflector described above and shown in Figs. 3 and 4 so as to provide a beam which is very wide spread horizontally.

The bulb is provided with two transverse filaments 36 and 37, the "road light" filament 36 being arranged on the horizontal axis of symmetry of the bulb and at a distance from the vertex of the reflector between one quarter and one fifth of the radius of the sphere so that the corresponding beam impinges upon the whole surface of the refractor 38. The filament 36 is preferably arcuate (Fig. 7) and has its convexity turned towards the reflector. The "courtesy" filament 37 is arranged above and in front of the "road" filament, at a distance from the reflector substantially equal to a third of the radius of the sphere, and it is placed in a cup 39 of which the edge is limited by the oblique plane passing through the centre of the sphere, and which is provided in front with an anti-glare screen 40. The vertical axis of symmetry of the bulb can also be slightly inclined forwardly and the plane limiting the edge of the cup 39 can in this case be arranged perpendicular to said axis. The refractor 38 (Figs. 6 and 7) comprises a marginal portion 41 having annular steps and of which the optical axis X'X coincides with the horizontal axis of symmetry of the reflector 35 along which is arranged the "road" filament 36. The foci of said annular steps are situated at points such as 36', 36'' on the optical axis X'X and at which the virtual images of the filament 36 are formed in the zones of the reflector 35 which supply the corresponding steps, so that rays such as mnp, m'n'p' leave the refractor 38 parallel with the optical axis X'X whereas the rays issuing from the extreme marginal astigmatic zone are convergent as in the case of Fig. 1 and serve for near lighting.

The central part 42 of the refractor 38 comprises a zone of approximately semi-circular contour 43 of which the centre 44 is below the optical axis X'X of the marginal zone 41 at a distance substantially equal to one third of the radius of the circle 43. The optical axis Y'Y of said part 42 of the refractor 38 is arranged very slightly above the "courtesy" filament 37 and this part of the lens has a single focus 37' located at the point where the image of the "courtesy" filament is formed in the central anastigmatic zone of the reflector 35. Said central part 42 of the refractor is provided with vertical steps such as 45, 45', 45" enabling this part of the lens to be made of small thickness while not producing any undesirable glare, owing to the vertical position of the prisms.

The refractor 38 may furthermore be provided with vertical diffusion striations in the manner commonly employed in automobile headlamp glasses.

Under these circumstances, the beam emanating from the anastigmatic central zone of the reflector 35 when only the "courtesy" filament 37 is operative, is spread over the whole area of the zone 42 of the refractor, and the corresponding rays coming from said zone are parallel with the optical axis Y'Y and give a beam which is strictly limited to a plane. On the other hand, rays such as $m''n''p''$ emanating from the upper marginal zone of the reflector 35, are turned downwards owing to the large degree of convergence of said zone.

When only the "road" filament 36 is operative, a beam of great axial power is obtained for the reasons given above. Furthermore, as the central zone of the reflector, on which the density of the flux emitted by the filament is very great, distributes said flux over a large outlet area, a very clear "road light" beam is obtained which does not produce any halo, whereas in the known automobile projectors the "road light" beam contains an intense central core which gives the driver the impression of forming a zone of haze which impairs visibility.

In Fig. 9 are shown on the one hand curves C, $C_1$ of the intensity of illumination in luxes at a distance of thirty meters obtained respectively with the "road light" and "courtesy light" of the device shown in Figs. 6 and 7, and on the other hand the corresponding curves $C'$, $C'_1$ obtained with an ordinary projector having a parabolical reflector provided with a transverse "road" filament arranged at the focus of the reflector, and an axial "courtesy" filament placed out of focus in a cup, the power of the lamps employed being exactly the same in both cases.

Comparative examination of these curves shows that:

1. For "road light" illumination, the arrangement according to the invention gives a more concentrated distance-beam (curve C) of which the axial power is about 20% greater than that of the usual arrangement (curve $C'$), in spite of the fact that as large a field can be obtained as desired.

2. For "courtesy light" illumination (curve $C_1$) the axial power is greater in a ratio of about 1 to 10 relatively to that of the known arrangements (curve $C'_1$) and furthermore, the "courtesy" light beam has a very large spread horizontally, practically equal to 180°, as well as a very diffused lighting at ground level and is not very bright.

I claim:

1. Optical system for dual-beam automobile headlamps, comprising an incandescent lamp of spherical shape, a silver coating forming a reflector on a part of the wall of said lamp, in said lamp a first transverse cylindrical "road" filament arranged along the optical axis of the reflector at a distance from the reflector of between one quarter and one fifth of the radius of the spherical lamp, a second transverse cylindrical "courtesy" filament arranged above and in front of the first at a distance from the reflector approximately equal to one third of the radius of the spherical lamp, a cup arranged below said "courtesy" filament and of which the edges are limited by an oblique plane passing through the centre of the spherical lamp; a convergent lens supplied with light rays by the silvered surface of the lamp and formed with an annular marginal zone of which the optical axis passes through the "road" filament, in said annular zone of the lens circular steps of which the foci coincide with the virtual images of the "road" filament from the zones of the reflector respectively supplying light rays to said steps, and a central zone of which the optical axis is parallel with that of the annular marginal zone and arranged slightly above the "courtesy" filament of the lamp, the focus of said central zone of the lens coinciding with the virtual image of the "courtesy" filament from the small anastigmatic central zone of the reflector, and vertical steps in said central zone of the lens.

2. Optical system according to claim 1, wherein the central zone of the lens is limited by a semi-circular contour of which the centre is below the optical axis of the circular zone and at a distance from said axis equal to about one-third of the radius of said semi-circular contour.

3. Optical system according to claim 1, wherein the cup arranged below the "courtesy" filament is provided in front with a screen hiding said filament from all points of the surface of the lens.

4. Optical system according to claim 1, wherein the transverse "road" filament is of arcuate shape and has its convexity turned towards the reflector.

5. Optical system according to claim 1, wherein the reflector is more enveloping horizontally than vertically.

6. Optical system for dual-beam automobile headlights comprising a concave reflector having a small anastigmatic central zone and a marginal astigmatic zone of which the foci are located between the vertex of the reflector and the focus of its anastigmatic central zone, an incandescent lamp with a transverse "courtesy" filament and a transverse "road" filament which are located consecutively between the focus of the central anastigmatic zone of the reflector and the vertex of the latter, the "road" filament being the nearest to said vertex, a cup arranged below said "courtesy" filament and of which the edges are limited by an oblique plane slightly sloping upwardly and rearwardly with respect to the optical axis of the reflector, a convergent lens supplied with light rays by the reflector and formed with an annular marginal zone comprising circular concentric zones of which the foci coincide with the virtual images of the "road" filament from the zones of the reflector respectively supplying light rays to said zones of the lens, and a central zone of which the focus coincides with the virtual image of the "courtesy" filament from the small anastigmatic central zone of the reflector.

HENRI ALEXANDRE HIPPOLYTE
JOSEPH SCHAFFNER.